Patented Aug. 19, 1952

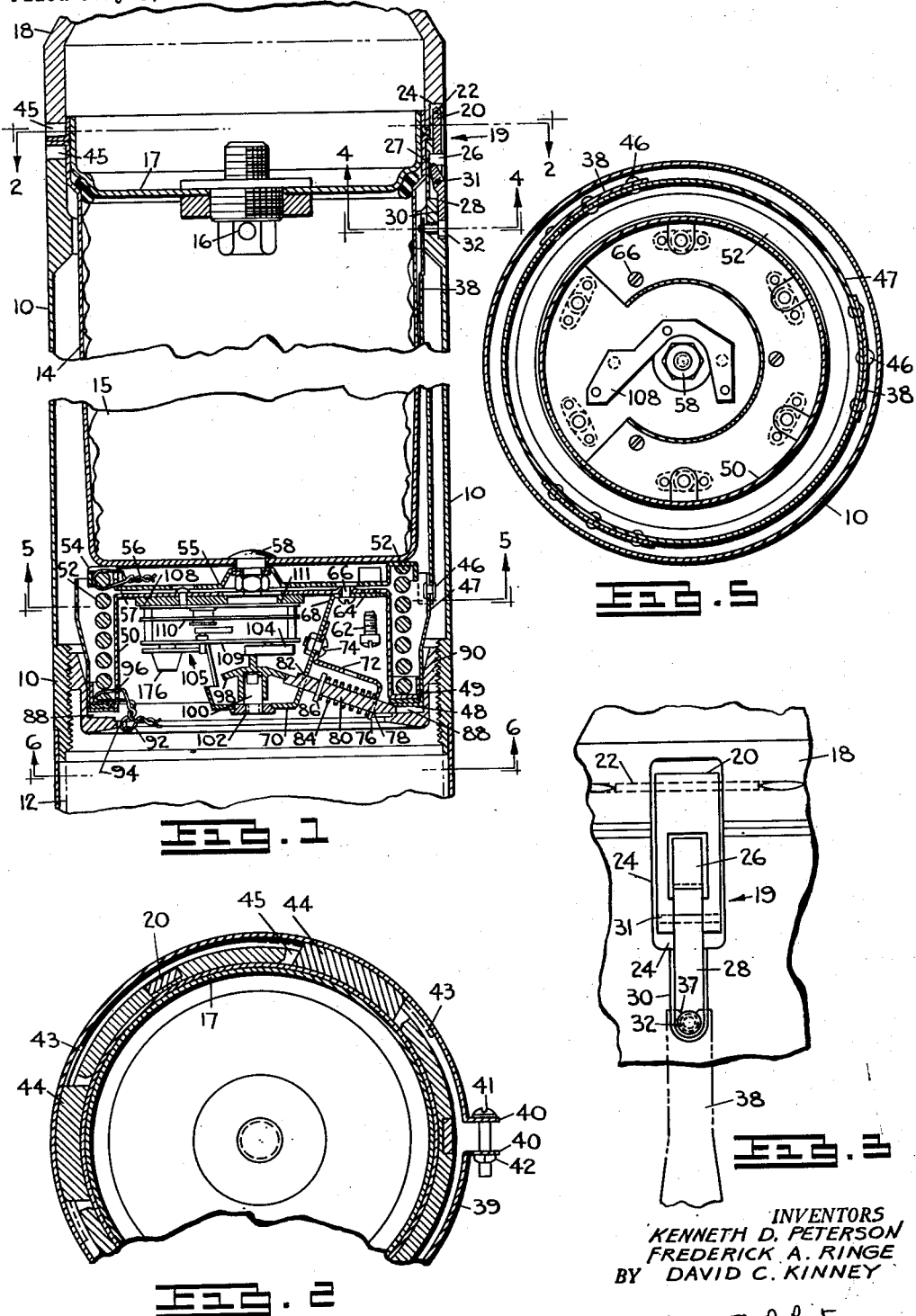

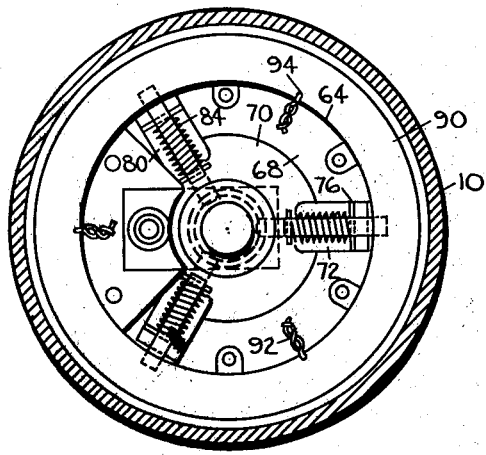
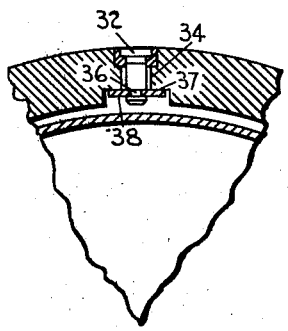
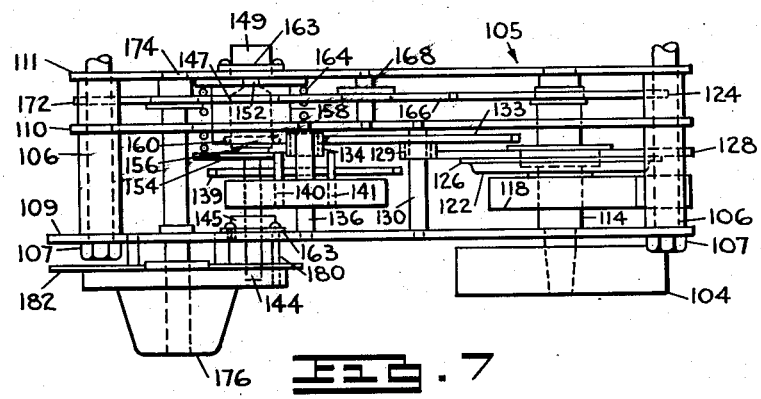
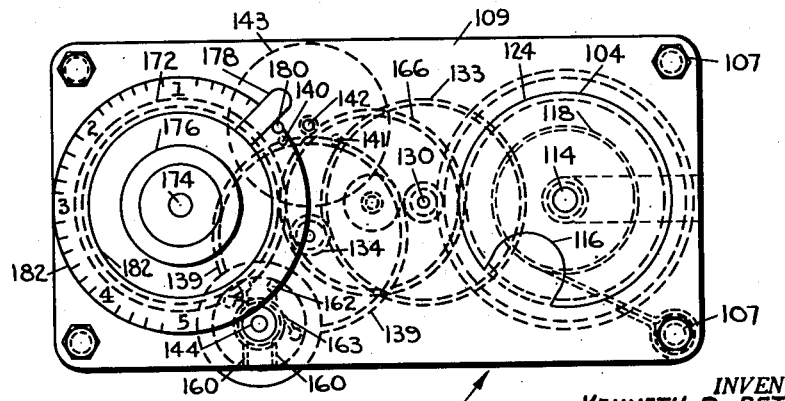

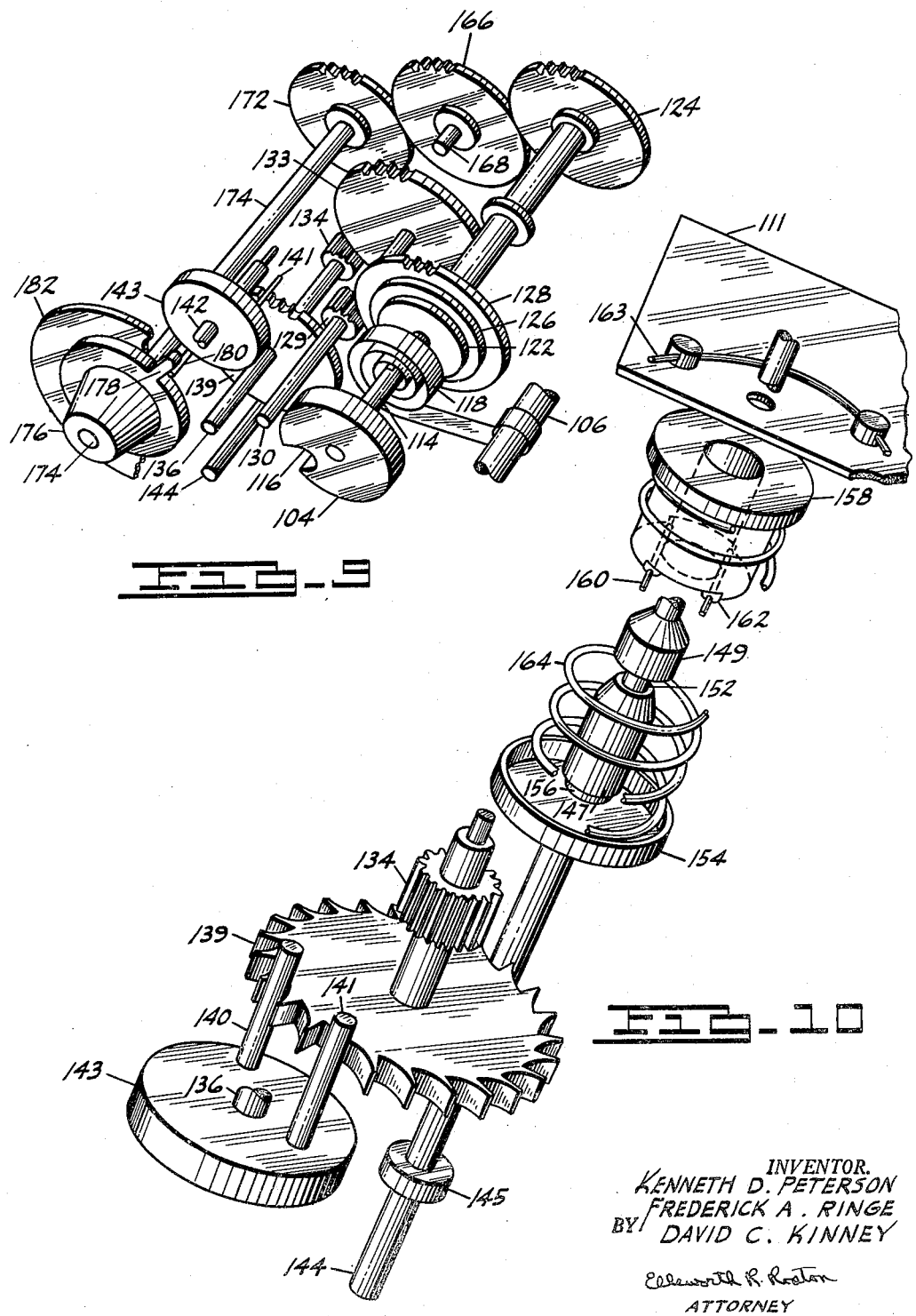

2,607,413

UNITED STATES PATENT OFFICE 2,607,413

RELEASE APPARATUS

David C. Kinney, East Detroit, and Kenneth D. Peterson and Frederick A. Ringe, Detroit, Mich., assignors to Bendix Aviation Corporation, Detroit, Mich., a corporation of Delaware Application July 3, 1950, Serial No. 171,868

14 Claims. (Cl. 161—1)

This invention relates to release apparatus and more particularly to apparatus for releasing a first mechanism from a second mechanism a predetermined time interval after the occurrence of a predetermined force. The invention incorporates safety features which permit the release apparatus to operate only upon the occurrence of the predetermined force.

As a result of the great advances which have been made in meteorological knowledge during the past few years, it is now believed that measurements of air temperature and pressure at altitudes up to 100,000 feet may be of considerable value in predicting future weather conditions. For example, slight changes in temperature and/or pressure at different altitudes may influence cloud formation, wind direction and wind velocity.

Systems are known for accurately and reliably measuring temperature and pressure at different altitudes so that slight changes in these conditions can be detected. Such systems convert the temperature and pressure measurements into a form which can be accurately transmitted to a ground station for recordation and analysis.

In such systems, the measuring and transmitting equipment is housed in the nose of a rocket which rises to a height of 100,000 feet after being launched. At substantially the maximum height of the rocket, the rocket nose is detached and a parachute attached to the measuring and transmitting equipment is opened so that the equipment will descend gradually to the ground. The temperature and pressure measurements are made as the equipment descends.

This invention provides apparatus for separating the rocket nose from the rocket body at substantially the instant that the rocket has reached its maximum height. The invention employs a timing mechanism which is cocked when the rocket is launched and which is operatively tripped when the rocket starts to slow down after it has consumed its fuel. The timing mechanism operates during the time that the rocket is continuing upwardly with a gradually decreasing speed. As the rocket reaches its maximum height, the timing mechanism frees a spring in the release mechanism, and the spring operates first to detach, and then to catapult, the rocket nose from the rocket body. The timing mechanism can be cocked only by the large accelerating force required to launch the rocket and the release mechanism can be operated only after the timing mechanism has been cocked and tripped. As a result, a safety factor is provided to prevent the rocket nose from becoming detached from the rocket body until after the rocket has been launched.

An object of this invention is to provide apparatus for releasing a first mechanism from a second mechanism after the occurrence of a predetermined force.

Another object of the invention is to provide apparatus of the above indicated character for delaying the release of a first mechanism from a second mechanism for a predetermined time interval after the occurrence of a predetermined force.

A further object is to provide apparatus of the above indicated character for detaching, and then catapulting, a first mechanism from a second mechanism.

Another object of the invention is to provide apparatus of the above indicated character for releasing the nose of a rocket from the rocket body at substantially the maximum height of the rocket.

Still another object is to provide release apparatus of the above indicated character, incorporating safety features to prevent the apparatus from being operated manually or accidentally.

A still further object is to provide release apparatus of the above indicated character which is simple, compact, efficient and reliable.

Other objects of the invention will be apparent from a detailed description of the invention and from the appended drawings and claims.

In the drawings:

Figure 1 is an elevational view in section of the release apparatus;

Figure 2 is a fragmentary sectional view substantially on the line 2—2 of Figure 1 and shows, in addition, apparatus for temporarily holding the different components in position while the components are being assembled.

Figure 3 is an enlarged fragmentary elevational view as seen from the right side of Figure 1 and shows in detail a latch for holding the rocket nose to the rocket body during the ascent of the rocket;

Figure 4 is an enlarged fragmentary sectional view substantially on the line 4—4 of Figure 1;

Figures 5 and 6 are sectional views substantially on the lines 5—5 and 6—6, respectively, of Figure 1;

Figure 7 is an enlarged elevational view of the timing mechanism shown in Figure 1;

Figure 8 is a bottom plan view of the timing mechanism shown in Figure 7;

Figure 9 is an enlarged perspective view of some of the components shown in Figures 7 and 8, as seen from a position below and in front of the components; and Figure 10 is an enlarged, exploded perspective view of some of the components shown in Figure 7 and 8, as seen from a position above and in back of the components.

In one embodiment of the invention a housing 10 (Figure 1) is provided for a rocket motor 12 and a container 14. A parachute 15 is stored in the container 14 and is attached by a link 16 to a supporting cylinder 17 which is positioned partially within the housing 10 and partially within a casing 18. The housing 10 is attached by latches, generally indicated at 19, to the casing 18, which serves as the nose of the rocket. The casing 18 houses apparatus (not shown) adapted to measure temperature and pressure at different altitudes and to transmit these measurements to a ground station for recordation and analysis.

The latches 19 have links 20 (Figures 1 and 3) which are pivotally mounted at one end on pins 22 journaled in the casing 18. The links 20 fit in sockets 24 in the casing 18 and housing 10 and are properly positioned in the sockets by keys 26 grooved as at 27. Links 28 fit in sockets 30 in the housing 10 and pivot on pins 31 journaled in the links 20. The links 28 taper at one end so as to fit in the grooves 27 when the latches 19 are in their closed position, and at their other end the links hold studs 32 (Figures 1 and 3) which extend through holes 34 (Figure 4) in the housing 10. At their shank ends, the studs have throat portions 36 which extend through slots 37 in downwardly extending fingers 38.

Before the casing 18 can be secured to the housing 10 by the latches 19, a band 39 (Figures 1 and 2) is placed around the housing 10 and casing 18. The band has outwardly turned clamp portions 40 which hold a screw 41 and nut 42. The band is provided with spaced flanges 43 which are inwardly turned so as to hold clips 44. The clips extend through openings 45 in the housing 10 and casing 18 and press against the wall of the container 14. The clips are inserted through the openings 45 while the screw 41 is loose, and the band is then rotated so that the clips are contained by the flanges 43. After the flanges 43 have been aligned with the clips 44, the screw 41 is tightened so as to press the band 39 against the housing 10 and casing 18. The band is removed after the latches 19 are locked by the fingers 38.

The fingers 38 are riveted at 46 (Figures 1 and 5) to a cylinder 47 having an annular lip 48 (Figure 1). The lip 48 engages a flange 49 on a supporting cylinder 50. A helical spring 52 is compressed between the flange 49 and an upwardly cupped rim 54 on a disc 55. The spring 52 is secured to the disc 55 as by wires 56 which loop around the end coil of the spring and extend through holes 57 in the disc rim 54, the ends of the wires being twisted to maintain the wire in position. The disc 55 is secured to the parachute container 14 as by a nut and bolt combination 58 and is also secured to the supporting cylinder 50 as by screws 62 while the release apparatus is being assembled. The screws 62 are removed after the latches 19 have been closed, since the spring 52 is then held by the lip 48 on the cylinder 47.

A bracket 64 is attached to the supporting cylinder 50 as by screws 66. The bracket has a portion 68 which extends obliquely downwardly and a horizontal portion 70 which is integral with the portion 68. A bracket 72 is attached as by screws 74 to the oblique portion 68 and is provided with a flange 76 having a hole 78. A pusher rod 80 extends through the hole 78 and through a hole 82 in the oblique portion 68 of the bracket 64. A compressed helical spring 84 is positioned on the pusher rod 80 between the flange 76 and a collar 86.

The pusher rod 80 extends into an annular gap 88 between the lip 48 and a cylindrical stop 90. The stop 90 is screwed into the housing 10 so that it will abut the pusher rod 80 when the latches 19 are closed. Wires 92 are inserted through holes 94 in the stop 90 and through holes 96 in the cylinder 50 and are twisted at their ends in a manner similar to the wires 56.

The pusher rod 80 pushes upwardly and radially inwardly upon a plunger 98 which is mounted on a pin 100 extending through a hole 102 in the horizontal portion 70 of the bracket 64. The plunger 98 in turn presses against a cam 104 in a timing mechanism generally indicated at 105 (Figures 1, 7, and 8). The timing mechanism 105 is mounted as by screws 106 and nuts 107 on the cylinder 50 and is separated from the cylinder by a spacing plate 108. Plates 109, 110 and 111 are provided to position and support the components in the timing mechanism 105.

The cam 104 (Figures 7, 8 and 9) is mounted on a shaft 114 journaled in the plates 109, 110, and 111, and is provided with a notched portion 116. The inner end of a compressed helical spring 118 is attached to the shaft 114 and the helical spring is wound around the shaft 114 and attached to one of the nuts 107 at its outer end. A clutch plate 122 and gear 124 are rigidly mounted on the shaft 114 and a fiber disc 126 and gear 128 are loosely mounted on the shaft. The clutch plate 122 and gear 128 are in frictional engagement with the fiber disc 126.

The gear 128 engages a pinion gear 129 on a shaft 130 journaled in the plates 109 and 110. The shaft 130 carries an idler gear 133 which engages a pinion gear 134 on a shaft 136 journaled in the plates 109 and 110. A ratchet wheel 139 (Figures 7, 8, 9 and 10) is mounted on the shaft 136 for alternate engagement with a pair of pins 140 and 141. The pins are connected to an inertia weight 143 which is mounted on a shaft 142. As the ratchet wheel rotates, it rocks the inertia weight back and forth in a pendulum-like motion by alternately engaging the pins 140 and 141.

The ratchet wheel 139 is normally prevented from rotating by a pin 144 (Figures 7, 8 and 10) which engages the teeth of the ratchet wheel. The pin 144 has collars 145, 147 and 149 which rest in suitable sockets in the plates 109, 110, and 111, respectively. The collars 147 and 149 are separated by a throat portion 152. A flange 154 is located between the collars 145 and 147 and is separated from the collar 147 by a throat portion 156. An inertia weight 158 is loosely mounted on the collar, and leaf springs 160 are attached under tension to pins 162 (Figure 8) in the inertia weight so as to exert radial forces upon the collar 147. Forces are also exerted upon the collar 147 by leaf springs 163 which are attached to the plates 109 and 111. These forces act toward the left upon the pin 144, as seen in Figure 8. A helical spring 164 is coiled around the inertia weight 158 and is positioned between the flange 154 and a flange on the inertia weight 158.

As previously stated, the gear 124 is mounted on the shaft 114. This gear meshes with an idler gear 166 (Figures 7, 8 and 9) mounted on a shaft 168 journaled in the plates 110 and 111. The gear 166 is driven by a gear 172 mounted on a shaft 174, the shaft being supported by the plates 109, 110, and 111. The shaft carries a knob 176 having a tab 178 (Figure 8) which limits the rotation of the knob in one direction by striking against a pin 180 in the plate 109. The knob is able to rotate in an opposite direction until the tab 178 engages the pin 144. A dial 182 calibrated in units of time may be provided around the periphery of the knob to indicate the times required to operate the timing mechanism 105 for different rotations of the knob 176.

Before the rocket is launched, the latches 19 are closed and the band 39 and clips 44 are removed. The ratchet wheel 139 is engaged by the pin 144 and the spring 52 is compressed between the lip 48 on the cylinder 47 and the rim 54 on the disc 55. The knob 176 is then rotated in a clockwise direction (Figure 8) through an angle corresponding to the particular time delay desired between the tripping of the timing mechanism 105 and the separation of the casing 18 from the housing 10. The tab 178 and pin 180 prevent the cam 104 from being rotated through an angle which will cause the notch 116 to lie adjacent the plunger 98. As the knob 176 is turned, the gears 172, 166, and 124 rotate but the gear 128 slips with respect to the fiber disc 126 to prevent an excessive pressure from being applied through the gears 129, 133 and 134 against the ratchet wheel 139. The slippage between the gear 128 and disc 126 does not affect the performance of the spring 118, since the spring is pre-wound.

When the rocket is launched, it has an upward acceleration in the order of 70g. The upward acceleration of the rocket causes a downward force to be exerted on the inertia weight 158, and this downward force is of sufficient magnitude to overcome the upward force exerted on the inertia weight by the spring 164. As a result, the inertia weight slides downwardly on the pin 144 until the springs 160, which are tensioned by the collar 147, become aligned with the throat portion 156. The springs 160 then relax by expanding into the throat portion 156 and prevent any further movement of the inertia weight 158 with respect to the pin 144 by holding the inertia weight between the collar 147 and the flange 154.

When the fuel in the rocket is completely consumed, the rocket starts to decelerate and causes an upward force to be exerted upon the inertia weight 158 and the pin 144. This causes the collars 145, 147, and 149 to move out of their respective sockets in the plates 109, 110, and 111, respectively. The leaf springs 163 then push the pin 144 to the left in Figure 8 so as to move the pin out of engagement with the teeth of the ratchet wheel 139. The ratchet wheel is driven by the spring 118 through the gears 128, 129, 133, and 134, the rate of rotation of the ratchet wheel being determined by the characteristics of the inertia weight 143. The cam 104 rotates with the gear 128, and, when the notch 116 in the cam becomes aligned with the plunger 98, the release apparatus is operated, the operation occurring at approximately the maximum height of the rocket.

As previously stated, the compressed spring 84 causes the pusher rod 80 to press upwardly upon the plunger 98 and the plunger in turn to press upwardly upon the cam 104. When the notch 116 becomes aligned with the plunger 98, the spring 84 pushes the plunger into the notch. At the same time, the spring forces the pusher rod 80 out of the gap 88, releasing the spring 52 for movement against the stop 90. As the spring 52 moves through the gap 88, it disengages the fingers 38 from the studs 32 and frees the links 28 for movement out of the sockets 30. The pivotal movement of the links 28 causes them to press upon the grooves 27 in the key 26 in such a manner that the links 20 pivot out of their sockets 24.

When the latches 19 are opened, the spring 52 becomes free to relax completely and instantaneously acts upon the disc 55, the container 14 and the cylinder 17. This instantaneous force causes the cylinder 17, the casing 18, the measuring and transmitting apparatus in the casing and the parachute 15 to be catapulted from the rocket body. The casing, being loosely fitted on the measuring and transmitting equipment, falls away from the other released parts and the parachute opens. Thus, as the measuring and transmitting equipment slowly descends to the ground, the equipment is able to measure air temperature and air pressure at different heights and to transmit these measurements to a ground station for recordation and analysis.

As may be seen, the timing mechanism 105 can be cocked only by a downward force of relatively large magnitude and the mechanism can be tripped only by an upward force of smaller magnitude. The release apparatus can be operated only after the timing mechanism has been cocked and tripped. As a result, the release apparatus cannot be operated until after the rocket has been launched, thus preventing any accidental or manual operation.

When the notch 116 in the cam 104 becomes aligned with the plunger 98 and the pusher rod 80 moves out of the gap 88, the spring 52 performs a double function. First it moves through the gap 88 to release the fingers from the studs 32. After the latches 19 have been opened, the spring catapults the casing 18, the measuring and transmitting apparatus in the casing, the cylinder 17, and the parachute 15 from the rocket body.

Although this invention has been disclosed and illustrated with reference to particular applications, it must be appreciated that the principles involved are susceptible of numerous other applications which will be apparent to persons skilled in the art. The invention is, therefore, to be limited only as indicated by the scope of the appended claims.

What is claimed is:

1. Apparatus for releasing a first mechanism from a second mechanism after a predetermined period of time, including, a cam, a plunger operative after a predetermined rotation of the cam, means for restraining the cam from rotating, means operative by a force in one direction to prepare the restraining means for release, and means operative by a force in an opposite direction to release the restraining means.

2. Apparatus for releasing a first mechanism from a second mechanism after a predetermined period of time, including, a ratchet wheel, a pivot pin restraining the rotation of the ratchet wheel, means operative by a movement in one direction to prepare the pivot pin for movement in an opposite direction, means operative by a movement of the pin in the opposite direction to release the pin from the ratchet wheel, a restrained spring operative to apply a releasing force to the first mechanism, and means operative to release the spring after a predetermined rotation of the ratchet wheel.

3. Apparatus for releasing a first mechanism from a second mechanism after a predetermined period of time, including, a coiled spring, means operable by a predetermined force to partially release the spring, means for delaying the operation of the releasing means for a predetermined period of time after the occurrence of the predetermined force, means for latching the first mechanism to the second mechanism, and means operable to open the latching means upon the partial release of the spring.

4. Apparatus for freeing a first mechanism from a second mechanism after a predetermined period of time, including, a spring connected to the second mechanism, means for maintaining the spring in a restrained position, latches on the first mechanism adapted to secure the first mechanism to the second mechanism, means for retaining the latches in a closed position, and means for partially releasing the spring to free the latches from their retaining means such that the spring may become fully released to separate the first mechanism from the second mechanism.

5. Apparatus for releasing a first mechanism from a second mechanism after a predetermined period of time, including, a recoiled spring, a stop separable by a limited gap from the spring, means for normally restraining the spring from moving against the stop, a cam operable upon the restraining means to release the spring for movement against the stop, means for preventing the cam from normally moving into its operative position, and means operative by a force of predetermined magnitude and direction to free the cam for movement.

6. Apparatus for releasing a first mechanism from a second mechanism after a predetermined period of time, including a recoiled spring, a stop separable by a limited gap from the spring, means for normally restraining the spring from moving against the stop, a cam operable upon the restraining means to release the spring for movement against the stop, means for preventing the cam from normally moving into its operative position, means operative by a force of predetermined magnitude and direction to free the cam for movement, and means for delaying the movement of the cam into its operative position for a predetermined period of time after the occurrence of the required force.

7. Apparatus for freeing a first mechanism from a second mechanism after a predetermined period of time, including, a spring associated with the second mechanism, means for maintaining the spring in a constrained position, latches on the first mechanism adapted to secure the first mechanism to the second mechanism, means for retaining the latches in a closed position, means operative by a force of predetermined magnitude for partially releasing the spring, the latches being freed from their retaining means upon the partial release of the spring and freeing the spring for complete release, the first mechanism becoming separated from the second mechanism upon the complete release of the spring, and means for delaying the freeing of the latches for a predetermined time interval after the occurrence of the force.

8. Apparatus for releasing a first mechanism from a second mechanism after a predetermined period of time, including, a ratchet wheel, means normally preventing the ratchet wheel from rotating, means operative by a force of predetermined magnitude and direction to release the ratchet wheel for rotation, motive means for driving the ratchet wheel after its release, a cam coupled to the ratchet wheel, a restrained spring, means for normally latching the first mechanism to the second mechanism, means operative by the cam to partially relax the spring, and means associated with the spring and the latching means for releasing the latching means upon the partial relaxation of the spring and for simultaneously releasing the spring for full relaxation so as to separate the first mechanism from the second mechanism.

9. Apparatus for freeing a first mechanism from a second mechanism, including a cam, means for normally preventing the cam from rotating, means operative by a predetermined force to release the cam for rotation, a spring, means for retaining the spring in coiled position, a stop, means for further coiling the spring to maintain the spring a predetermined distance from the stop, a cam, means for rotating the cam, movement against the stop after a predetermined rotation of the cam, means for normally latching the first mechanism to the second mechanism, and means connected to the latching means and the retaining means to maintain the latching means in closed position before the spring is released for movement against the stop and to release the latching means for opening and the spring means for complete release after the spring has moved against the stop.

10. Apparatus for freeing a first mechanism from a second mechanism after a predetermined period of time, including, a spring, means for retaining the spring in recoiled position, a stop, means for maintaining the retaining means a predetermined distance from the stop, latching means for locking the first mechanism to the second mechanism, means connected to the retaining means and to the latching means to maintain the latching means in closed position and the spring in recoiled position during the time that the retaining means is spaced from the stop, and means operative by a predetermined force to release the retaining means for movement against the stop so that the latching means may become opened and the spring may be released for movement to catapult the first mechanism from the second mechanism.

11. Apparatus for freeing a first mechanism from a second mechanism, including, first linkages pivotable on the first mechanism, second linkages pivotable on the first linkages, a pin extending through each of the second linkages and the second mechanism, means for engaging the pins to maintain the pins in extended position for the engagement of the first mechanism by the second mechanism, a spring, means associated with the pin-engaging means for maintaining the spring in a partially constrained position, a stop, a pusher rod adapted to be positioned between the spring and the stop to maintain the spring in a further constrained position, and means operative by a predetermined force to move the pusher rod from its location between the spring and the stop so as to release the spring for movement against the stop and the engaging means from contact with the pin.

12. Apparatus for freeing a first mechanism from a second mechanism, including, first linkages pivotable on the first mechanism, second linkages pivotable on the first linkages, a pin on each of the second linkages adapted to extend through the second mechanism, a finger adapted to engage each pin, a spring, means associated with the fingers for maintaining the spring in a partially coiled position during the extension of the linkages, a stop, a pusher rod for further coiling the spring by maintaining a predetermined gap between the spring and the stop, a plunger associated with the pusher rod, means for normally blocking the movement of the plunger and the pusher rod, means operative by a predetermined force to remove the blocking means from the path of the plunger, and means operative upon the release of the plunger to move the pusher rod from the gap between the spring and the stop so that the spring can move against the stop and release the linkages for a pivotal relaxation.

13. Apparatus for freeing a first mechanism from a second mechanism, including, a latch adapted to retain the first mechanism in fixed position relative to the second mechanism when closed and to free the first mechanism from the second mechanism when released, means for engaging the latch to normally maintain it in closed position, a spring, means associated with the engaging means to maintain the spring in a coiled position, a stop, means for further coiling the spring so as to space it a predetermined distance from the stop, a cam, means for rotating the cam, means for normally preventing the cam from rotating, means operative upon the occurrence of a predetermined force to release the cam for rotation, and means associated with the cam and the spacing means and operative after a predetermined rotation of the cam to move the spacing means so that the spring may move against the stop and release the latch for the disengagement of the first mechanism from the second mechanism.

14. Apparatus for freeing a first mechanism from a second mechanism, including, a ratchet wheel, means for normally restraining the ratchet wheel from rotating, means operative by a predetermined force to release the ratchet wheel for rotation, a cam rotatable upon the release of the ratchet wheel, a plunger operative by the cam after a predetermined rotation of the cam, a stop, a constrained spring positioned a predetermined distance from the stop, means operative by the plunger to partially relax the spring for movement against the stop, first linkages pivotable on the first mechanism, second linkages pivotable on the first linkages, a pin extending through each of the second linkages and the second mechanism before the partial relaxation of the spring, and means for engaging the pins to contain the spring for an initial partial relaxation and for releasing the pins upon the partial relaxation of the spring so that the spring may completely relax and catapult the first mechanism from the second mechanism.

DAVID C. KINNEY.
KENNETH D. PETERSON.
FREDERICK A. RINGE.

REFERENCES CITED

The following references are of record in the file of this patent:

UNITED STATES PATENTS

| Number | Name | Date |
|---|---|---|
| 1,875,616 | Kohout | Sept. 6, 1932 |
| 1,995,070 | Lux | Mar. 19, 1935 |
| 2,025,511 | Johnson | Dec. 24, 1935 |
| 2,166,683 | Grayson | July 18, 1939 |
| 2,479,922 | Gates | Aug. 23, 1949 |